Patented Nov. 22, 1932

1,888,270

UNITED STATES PATENT OFFICE

JOHN S. HIPPLE, OF TEMPLE, PENNSYLVANIA

PROCESS AND METHOD OF PRODUCING EXPANSION JOINT FILLING MATERIAL

No Drawing.    Application filed March 17, 1931.    Serial No. 523,377.

This invention relates generally to a method and process for producing a new and novel expansion joint filling material such as is described in detail in contemporary patent application, Serial No. 523,375, filed March 17, 1931, entitled Expansion joint filling material, and relates particularly to a new and novel method of producing such a material in a convenient, expeditious, and inexpensive manner, disclosing admirable efficiency and susceptibility of mass production.

It is an important object of this invention to provide a method or process of the type described which will make possible the production of a superior material of the character alluded to, with the smallest use of materials and labor, and in the least time consistent with efficient production.

This and other objects of the invention, its nature, and its composition and arrangement and combination of parts will be readily understood by anyone acquainted with the art to which this invention relates, as well as the steps and operations involved in the process and their duration and sequence upon reading the following descriptions and explanations.

Broadly, the process or method of the invention consists in oxidizing vegetable oil or fat or any unsaturated fat or fatty oil capable of being oxidized and vulcanized, and adding thereto rosin, pulverized silica and "Hydrolene". Sulphur is added to vulcanize and oxidize the oil and fat, the rosin is added to make the product a sticky mass, the "Hydrolene" is added to harden or stiffen or give body to the material, and the pulverized silica is added to give weight and add substance and homogeneity to the final product.

Specifically, the method consists in heating proper proportions of cottonseed oil, linseed oil, rosin, and "Hydrolene" in an iron kettle under an open flame to about 200 degrees centigrade, or until the rosin and "Hydrolene" are liquefied. Upon the appearance of this phenomenon, the pulverized silica and sulphur is added. The heating is continued until the vulcanization and other re-actions have begun, at which point the heat is withdrawn, and the product permitted to cool and it is then poured into suitable molds, or into the expansion joints to be filled.

Prepared as above, 8 parts of cottonseed oil, 8 parts of linseed oil and 8 parts of sulphur, together with 4 parts of rosin, 4 parts of pulverized silica and 1 part of "Hydrolene", produce a very efficient and superior material of the type described, which is soft, plastic, elastic and pliable, as well as adhesive, and which will not chip and fracture at low temperatures, and which will not flow and break down as do asphaltum or tar products, at relatively high temperatures.

Due to the comparatively lower cost and greater availability of the various vegetable oils, fish oils, fats, and the like, which are absolutely suited to be used in place of the mentioned cottonseed oil, linseed oil, the above process or method of making a superior expansion joint filling material may be carried out at a cost lower than the existing, less efficient and less desirable process for making expansion joint filling materials, and the product resulting therefrom is superior and yet of lower cost.

It is to be understood that I do not desire to limit the application of this invention to the particular modification set out herein to illustrate the principles thereof, and any change or changes may be made in materials and ingredients, and in the duration and sequence of the steps and operations of the process, consistent with the spirit of the invention and the scope of the subjoined claim.

What is claimed is:—

1. The process of making expansion joint filling material which comprises mixing together 16 parts of vulcanizable vegetable oils, 4 parts of rosin, and 1 part of "Hydrolene" and liquefying the mixture by application of heat thereto; and then introducing into the liquefied mixture 8 parts of sulphur and 4 parts of pulverized silica, and continuing the application of heat until vulcanization thereof takes place, then withdrawing the heat and permitting the vulcanized mass to cool for pouring.

2. The process of making expansion joint filling material which consists in mixing together 16 parts of vulcanizable vegetable oils, 4 parts of rosin, and 1 part of "Hydrolene" and liquefying this by application of heat thereto; and then introducing 8 parts of sulphur and 4 parts of pulverized silica into the mass as it reaches liquefied form, the application of heat being permitted to continue until vulcanization and amalgamation takes place, whereupon the heat is withdrawn and the resultant mass permitted to cool before pouring the same.

3. The process of making expansion joint filling material which comprises mixing together 16 parts of vulcanizable vegetable oils, 4 parts of rosin, and 1 part of "Hydrolene" and liquefying the mixture by application of heat thereto; and then inroducing into the liquefied mixture 8 parts of sulphur and 4 parts of pulverized silica, and continuing the application of heat until vulcanization thereof takes place, then withdrawing the heat and permitting the vulcanized mass to cool for pouring, said heat being at 200° centigrade.

4. The process of making expansion joint filling material which consists in mixing together 16 parts of vulcanizable vegetable oils, 4 parts of rosin, and 1 part of "Hydrolene" and liquefying this by application of heat thereto; and then introducing 8 parts of sulphur and 4 parts of pulverized silica into the mass as it reaches liquefied form, the application of heat being permitted to continue until vulcanization and amalgamation takes place, whereupon the heat is withdrawn and the resultant mass permitted to cool before pouring the same, said heat being at 200° centrigrade.

In testimony whereof I affix my signature.

JOHN S. HIPPLE.